United States Patent
Adler et al.

(10) Patent No.: US 10,289,687 B2
(45) Date of Patent: May 14, 2019

(54) SPACE OPTIMIZED SNAPSHOT FOR NETWORK BACKUP

(71) Applicant: VMware, Inc., Palo Alto, CA (US)

(72) Inventors: Nir Adler, Herzliya (IL); Boaz Harel, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 303 days.

(21) Appl. No.: 15/092,913

(22) Filed: Apr. 7, 2016

(65) Prior Publication Data

US 2017/0293628 A1 Oct. 12, 2017

(51) Int. Cl.

| | |
|---|---|
| *G06F 7/00* | (2006.01) |
| *G06F 17/00* | (2006.01) |
| *G06F 17/30* | (2006.01) |
| *G06F 11/14* | (2006.01) |

(52) U.S. Cl.
CPC .... *G06F 17/30088* (2013.01); *G06F 11/1453* (2013.01); *G06F 11/1464* (2013.01); *G06F 17/30194* (2013.01); *G06F 2201/84* (2013.01)

(58) Field of Classification Search
CPC ......... G06F 17/30088; G06F 17/30194; G06F 11/1464; G06F 11/1453
USPC ......................................... 707/644, 649, 654
See application file for complete search history.

(56) References Cited

U.S. PATENT DOCUMENTS

| | | | |
|---|---|---|---|
| 8,190,835 B1 * | 5/2012 | Yueh | ..................... G06F 3/0608 711/159 |
| 2006/0123211 A1 * | 6/2006 | Derk | .................. G06F 11/1451 711/162 |

* cited by examiner

*Primary Examiner* — Md I Uddin

(57) ABSTRACT

A system is described for backing-up a client device to a server using space-optimized snapshots. A snapshot is captured on the client device. The system determines which files of the snapshot are required to be uploaded to perform a backup. Thereafter, the system monitors the required files (and not other files) for write commands and directs write operations for the required files to be performed copy-on-write. After a required file is uploaded, the system stops monitoring the file and any copy-on-write data that may have been generated for the file is removed from the snapshot to conserve space. The process continues until all required files are uploaded.

14 Claims, 3 Drawing Sheets

SPACE OPTIMIZED SNAPSHOT FOR NETWORK BACKUP

TECHNICAL FIELD

The present disclosure generally relates to backups of computing devices and more specifically to techniques for efficient use of snapshots in backing up computing devices on enterprise networks.

BACKGROUND

Network backup of computing devices is becoming more and more commonplace in today's work environments. With this technology, a user's computer is periodically backed up to a central server in the background when the device is connected to a network. Often, this can be performed without interruption to the user and without the user being aware of the backup being performed. When a need arises to restore the desktop, the backup copy of the desktop can be retrieved from the server and installed onto a computing device. For example, the backup copy of the desktop can be installed on a new device in the event of device loss, breakage, or migration to a new device. Also, a backup copy of the desktop can be installed back to the same device; for example, to restore the device to a previous point in time, to perform repairs, and so on. As a result, an organization is able to save time and preserve valuable data and resources by continuously backing up employee computing devices over the network.

In many instances, a backup operation on a computing device is performed by taking a snapshot, i.e., capturing the state of the system at a particular point in time, and uploading disk contents to the server to ensure that the state of the system at the particular point in time is available on the server. Generally, the transfer of data to the server only includes the transfer of data that has changed from a previous backup. Further, in cases where a single instance store and data deduplication is implemented on the server, files may not need to be transferred if they are already present on the server, e.g., from the backup of another client.

Nonetheless, in many cases, a backup operation can involve transfer of large amounts of data, which can take a long time particularly when network conditions are suboptimal. For example, such scenarios are likely during an initial backup or "centralization," where large amounts of data are generally transferred. Another scenario where a backup may require a long time is where the user of the device produces a lot of data, for example, if the user is a developer. In yet another scenario, a backup may require a long time if the device has not been backed up for a long time, for example, if the user has not had access to a network. In these cases, and others, numerous issues can arise due to lengthy backup operations.

For example, in many standard systems, during the upload of data from the client to the server, write operations on the client device are performed copy-on-write. Namely, to ensure consistency, a system backup needs to represent the contents of the device frozen in time. Hence, after the snapshot is captured, any changes to a file are made copy-on-write by writing changes to a copy of the file data, thereby preserving the state of the file and the system as they were when the snapshot was captured. Accordingly, all write operations continue to be copy-on-write until the backup is complete. As a result, in situations where the backup takes a long time and the user is active on the device, significant volumes of copy-on-write data is produced, consuming valuable system resources and potentially causing the system to run out of space. Further, in many cases, once the copy-on-write data exceeds a certain volume, the operating system will dump the snapshot, aborting the backup process and any progress made, and forcing the system to restart the backup operation anew.

A more efficient approach is desirable for managing client device backups in enterprise network environments.

DETAILED DESCRIPTION

Figure 1:
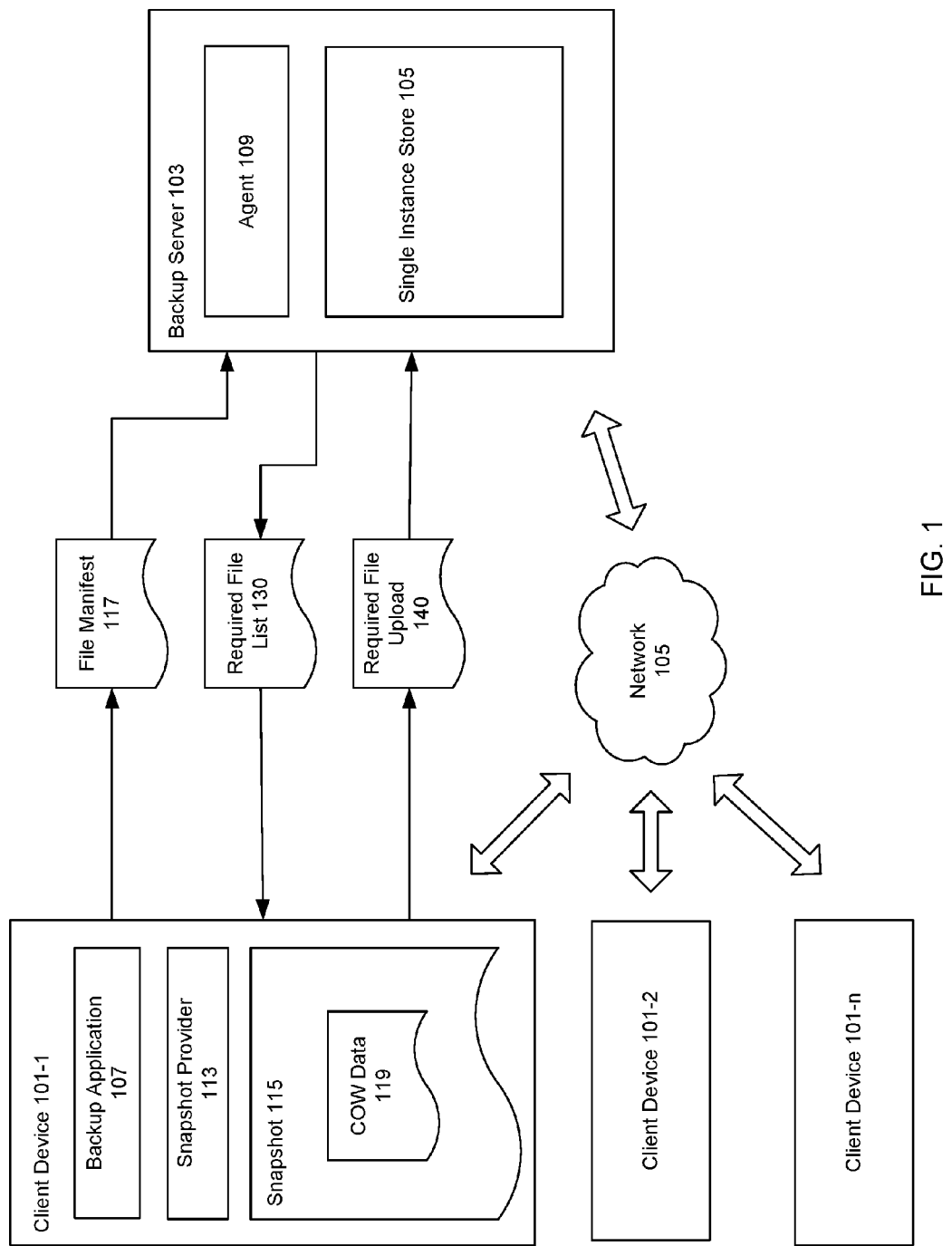
FIG. 1 illustrates an example architecture of a system for performing backups using space optimized snapshots, in accordance with various embodiments.

Systems and methods in accordance with various embodiments of the present disclosure overcome at least some of the above mentioned shortcomings and deficiencies by providing more efficient ways to backup devices in enterprise environments. In particular, embodiments described herein leverage snapshots that conserve space by reducing the amount of copy-on-write data generated and stored during backup of an endpoint device.

In this architecture, the process of backing up a client computing device to a backup server begins by capturing a snapshot of the full disk contents of the device. The files in the snapshot are scanned and a signature, such as an MD5 message-digest algorithm hash value, is calculated for each file. The list of calculated signatures, or "file manifest", is uploaded to the server to determine which files are required to be uploaded to the server to back-up the device. For example, the server may implement a single-instance-store ("SIS"), which is described in more detail below, in which case the file manifest can be checked against all files available in the SIS on the server to determine which files of the client are not already available on the server, in a process known as "deduplication". Subsequently, a list containing the required files that are not available on the server is conveyed to the client.

Once the required files are identified at the client, the system begins uploading the required files to the server to back-up the device. To ensure consistency of the backup, the system monitors the required files, such that a write command to a required file is performed copy-on-write (COW) while write commands to other (non-required) files can be written directly to such files, as done during normal operation. Once an upload of a required file is complete, the system stops monitoring the required file, such that subsequent write commands to the file are written to the file directly, without the COW mechanism. Additionally, once the upload of the required file is complete, any COW data that was generated through write commands to the file (e.g., during the upload) can be deleted to fee up space. Prior to deleting the COW data, changes to the file contained in the COW data that were written using the COW mechanism can be incorporated into the file so they are preserved. This process continues with each required file until all required files are uploaded.

As a result, the amount of copy-on-write data that is produced during the backup is limited. For example, because only the required files (and not all files in the snapshot) are monitored for copy-on-write operations, the amount of copy-on-write data generated is reduced in comparison to a system that, for example, writes COW for every file contained in a snapshot until the backup is fully complete. Space is also conserved because COW data that was generated by write commands to a required file is deleted after the required file finishes uploading. Furthermore, space is also conserved because the system stops monitoring a required file once the required file finishes downloading, avoiding further generation of COW data from write operations to the file.

As used herein, the term "snapshot" generally refers to a read-only point-in-time capture of disk contents. A snapshot "freezes" disk contents while the system uploads files to the backup server, in order to make certain that the upload represents the state of the system at a particular point in time, by ensuring that contents do not change and are not locked while the backup is being made. This is achieved in large part via the copy-on-write mechanism. Use of snapshots in backups is well known and will not be discussed in great detail herein so as not to obscure salient points of the invention.

Snapshot-capturing tools are widely available commercially. For example, the Windows operating system, available from Microsoft Corp., includes a technology known as Shadow Copy (also known as Volume Snapshot Service, Volume Shadow Copy Service, or VSS) that allows taking manual or automatic snapshots (VSS snapshots) of computer files, even when they are in use. In Windows, an application is able to request the VSS service to capture a VSS snapshot, which can be used for various purposes, including for performing system backups.

In various embodiments, snapshots can be generated by applications that are specifically created for the purpose of carrying out the systems and methods described herein. In other embodiments, available snapshot capturing tools, such as the Windows VSS service, can be modified or extended to perform the invention. For example, while Windows comes with a default VSS snapshot provider, software and hardware vendors can create their own new software or hardware providers that use different mechanisms for capturing snapshots than the default VSS snapshot provider. The new snapshot providers can be registered with the Volume Shadow Copy service so they can be called on by an application requesting a snapshot. Hence, in various embodiments, the invention can be performed by creating a snapshot provider or modifying an existing snapshot provider, and registering such a new snapshot provider with the Windows VSS service so that it can be called by a requesting application.

As mentioned, a snapshot is generally used to preserve the state of a system until a backup is complete, to ensure consistency. Namely, the backup needs to represent the state of the system frozen at a point in time to ensure that a consistent state of the system can be subsequently restored from the backup files. Accordingly, in order to preserve a file when a user attempts to make changes to it after the snapshot is captured, such changes have to be produced using the copy-on-write mechanism (COW). The COW mechanism allows writing to a file while preserving the file's original state by creating a copy of data as it is being written over. Namely, if a write command for a file is detected, the command is performed copy-on-write by writing to a copy of the file data. For example, in a block-level COW mechanism, if a write command making changes to a certain block is received, the entire block can be copied to a new location, and the requested changes can be made to the copied block, preserving the original block. The COW data generated while the snapshot is alive becomes part of the snapshot. Accordingly, the size of the snapshot grows as the system continues to receive write requests.

In existing technologies, after a backup snapshot is produced, generally all write commands to files that are part of the snapshot are produced COW until the backup is finished. As a result, if the computing device is used by a user during the upload, large amounts of copy-on-write data can be generated resulting in a snapshot that is rapidly increasing in size. This can be particularly true in cases where the upload takes a long time; for example, due to poor connectivity or due to large volumes of upload data. Some instances where large volumes of upload data are common are during initial backups or "centralization"; if the user of the device produces a lot of data, for example, if the user is a developer; or if a device has not been backed up for a long time, for example, if the user has not had access to a network. Thus, in these situations and others, the size of the snapshot can become extremely large, consuming valuable system resources and potentially causing the system to run out of space. Further, in many cases, if the size of the snapshot exceeds a certain limit, the operating system will dump the snapshot, aborting the backup process, and forcing the system to restart the backup operation anew. For example, in a Windows operating system, the system dumps the VSS snapshot once it exceeds a certain size, thereby interrupting the backup progress. The backup process would then need to be restarted by re-capturing the snapshot, repeating the file manifest exchange and deduplication, and the like. The embodiments described herein aim to overcome at least some of these issues by reducing the size of the snapshot used in backups.

FIG. 1 illustrates an example architecture of a system for performing backups using space optimized snapshots, in accordance with various embodiments. As illustrated in the example of FIG. 1, numerous client devices 101-1, 101-2, and 101-n are communicatively coupled with a backup server 103 via a network 105. As will be described in more detail below, each client device (e.g., 101-1, 101-2, and 101-n) can be backed-up to the backup server 103 over the network 105. Network 105 may be a local area network (LAN), wide area network (WAN), a combination of networks, or other form of remote communication link between the server 103 and client devices 101-1, 101-2, and 101-n. Network 105 may further include numerous other components, such as one or more firewalls, connection brokers, management servers, etc., which are not shown here so as not to obscure the salient features of the environment. Backup server 103 may physically reside in a data center of an enterprise or in a data center of a third party service provider. Client devices 101-1, 101-2, and 101-n can be any computing devices such as laptop computers, desktop computers, tablets, smartphones, etc.

It should be noted that the particular deployment illustrated in FIG. 1 is shown purely for purposes of illustration and is not intended to be in any way limiting to the embodiments that are described herein. For example, a typical environment would contain many more client devices as well as other components not illustrated herein. It will be apparent to one of ordinary skill in the art that the example shown in FIG. 1, as well as all other figures in this disclosure have been simplified for ease of understanding and are not intended to be exhaustive or limiting to the scope of the invention.

For the sake of being concise, only client device 101-1 is illustrated in exploded view. However, even though not illustrated, each client device (e.g., 101-2, 101-n) can contain components and perform operations analogous to those illustrated and described with respect to client device 101-1.

In various embodiments, a backup application 107 runs on the client device 101-1. The backup application 107 can be any application that utilizes snapshots to perform data backups on the client device 101-1. The backup application 107 may be a dedicated backup application or an application that performs backups as well as other functions. The backup application 107 may also operate in conjunction with other applications running on other devices on the network 105, such as the server (e.g., 103). For example, in various embodiments, the backup application may operate in conjunction with an agent 109 running on the backup server 103. The agent 109 may perform server-side operations in the backup process as well as facilitate communications and data transfers between the server 103 and client devices (e.g., 101-1, 101-2, 101-n).

In an embodiment, the backup application 107 may be the client-side component of the VMware Mirage™ system by VMware, Inc. Mirage is a system that allows centralized remote management; e.g., by an information technology (IT) department of an organization, of client devices (e.g., 101-1, 101-2, 101-n) on a network (e.g., 105) and offers other features and benefits for users and for the IT department, such as backups of client device (e.g., 101-1, 101-2, 101-n). The Mirage system deployment includes a client-side component (e.g., 107) on clients (e.g., 101-1, 101-2, 101-n) that is in communication with a server-side component (e.g., 109) running on a central server (e.g., 103). As part of its operations, Mirage performs periodic backups of clients (e.g., 101-1, 101-2, 101-n). Additionally, during initial deployment of Mirage, client devices (e.g., 101-1, 101-2, 101-n) on the network (e.g., 105) are backed up to the server (e.g., 103), in a process called centralization, to enable the various functions of the system. Accordingly, embodiments described herein may be implemented with the Mirage system for performing backups.

In the example of FIG. 1, the backup server 103 further contains a single instance store 105 (SIS). Generally, a SIS is a de-duplicated storage located in an enterprise (such as network attached storage (NAS) server, e.g., 103) where desktop images of client devices (e.g., 101-1, 101-2, 101-n) are stored, e.g., for backup purposes. The single instance store de-duplicates the stored desktop images such that only one copy of a given file needs to be stored. For example, numerous desktop images can contain pointers to the single copy of the file in the SIS instead of containing duplicate copies of the file. Thus, unique desktop files only need to be stored once in the de-duplicated SIS instead of storing individual copies for each client device, thereby dramatically cutting storage costs. Further, each client device (e.g., 101-1, 101-2, 101-n) periodically uploads incremental file changes into the SIS as part of an ongoing backup/synchronization process. Accordingly, an up-to-date desktop image of each user's device (e.g., 101-1, 101-2, 101-n) can be constantly kept in the SIS. An example of a product that implements such a SIS is the VMware Mirage.

As will be apparent to one skilled in the art, a SIS is merely one method of storing and backing-up desktop images of client devices on a network. Storage systems other than a SIS can also be used with this invention. For example, the invention may be implemented in a more traditional system that stores a separate, complete desktop image for each client device and periodically updates the desktop image of each client by uploading incremental file changes as part of an ongoing backup/synchronization process.

In various embodiments, to perform a backup, backup application 107 requests a snapshot 115 of the client device 101-1 from a snapshot provider 113. For example, backup application 107 may be configured to back-up client device 101-1 at a predetermined frequency (e.g., daily), when a user requests a backup, when prompted by agent 109, and/or according to any other preset rules, policies, or triggers. Snapshot provider 113 can be any application (implemented in software and/or hardware) configured to capture a snapshot (e.g., 115) of the client device 101-1. For example, in a Windows system, the snapshot 15 can be requested from the snapshot provider 113 by the application 107 via the Windows VSS service. In an embodiment, the snapshot provider 115 can be a modified version of the default Windows VSS snapshot provider that has been registered with the VSS service. In another embodiment, the snapshot provider 115 can be an originally developed snapshot provider that has been registered with the VSS service.

Once the snapshot 115 is captured, subsequent write operations on the client device 101-1 are performed copy-on-write in order to preserve the state of the machine and ensure consistency of the backup, as discussed previously. Thus, the snapshot provider 113 monitors files on the system and, when a write commands to a file is detected, the snapshot provider 113 directs the system to write to the file using the COW mechanism by writing the changes to a copy of the file data. Consequently, the copy of the file data containing the changes, or the "COW data" 119, is stored in the snapshot 115. It should be noted that, at this point in the process, the snapshot provider 113 may be configured to monitor all files in the system except certain excluded files. For example, the system may be configured not to monitor certain files that are not desired for backup.

After the snapshot 115 is captured, backup application 107 calculates a file manifest 117 of the snapshot 115 by calculating a signature for each file in the snapshot. A file signature can be any value that uniquely identifies a file. For example, the file signature can be an MD5 message-digest algorithm hash value. Consequently, the file manifest 117, containing the file signatures for each file in the snapshot 115 is conveyed to the backup server 103.

At the backup server 103, the file manifest 117 is compared against the files available in the SIS 105 to determine which files are required to be uploaded from the computing device 101-1 in order to back up the device 101-1. Namely, any files in the file manifest 117 that are not available in the single instance store 105 would need to be uploaded from the client device 101-1 to complete the backup (i.e., in order for a complete desktop image of the device 101-1 to be available on the server 103). Thus, the required files are identified and a required file list 130 is conveyed back to the client device 101-1.

In various embodiments, the server 103 can maintain a list of files that client devices (e.g., 101-1, 101-2, 101-n) expect the server 103 to have (e.g., files on the file manifest 117 that are determined to be available on the server 103) to ensure that such files are not deleted through other system operations. For example, in some cases the server 103 might inform the client 101-1 that a specific file doesn't need to be uploaded because it already exists in the SIS 105 from the back up of one other client. However, the other client might mark this file for deletion (e.g., if the user of the other client deletes the file and the other client is backed up). This can result in a missing file because the client device 101-1 will not upload the file and the other client device will tell the server 103 to delete it from the SIS 103. To prevent this, the server 103 can maintain the list of files that uploading clients are expecting the server 103 to already have and prevent deletion of files on the list, in order to ensure that each client will have a persistent backup without missing files.

It should be noted that, particularly in systems where a storage system other than a SIS store (e.g., 105) is implemented, different methods may be used to identify required files for a backup. The particular technique for identifying required files is not critical to practicing the invention described herein and the invention may nonetheless be applicable to such other systems.

It is also noted that, when identifying required files (e.g., 130), certain files may be excluded due to additional criteria. For example, the system may be configured to exclude certain predefined files or predefined types of files from the backup. This may be the case because those files or types of files are not considered sufficiently important to be backed-up (e.g., certain types of temporary files) or for other reasons.

After the required file list 130 is received at the client device 101-1, if any COW data 119 was produced for files that are not in the list 130 (e.g., pursuant to write requests to those files), such COW data 119 can be deleted from the snapshot 115. Namely, because those files are available in the SIS 105 in their state at the time of the snapshot 115 and consequently will not be uploaded to the server 103, there is no need to preserve the state of those files in the snapshot 115. To clarify, in this situation, when the COW data 119 is deleted, not all of the COW data 119 is necessarily deleted but only the portion of the COW data 119 that corresponds to the non-required files. For example, any COW data 119 that was produced pursuant to write requests for required files should not be deleted.

Further, before deleting the COW data 119 for non-required files, the data 119 can be incorporated into the actual files on the client device 101-1 so that the changes are not lost. For example, the COW data 119 can be incorporated into the actual files by replacing corresponding blocks of the file's data with blocks from the COW data 119, or the differences in the blocks in the COW data 119 can be translated to the corresponding blocks of the actual file.

Additionally, once the required file list 130 is received, the snapshot 115 can stop monitoring the non-required files, such that subsequent write commands to the non-required files are produced directly to the file, as done under normal operation, instead of by using the COW mechanism. Notably, if any COW data 119 was generated for a required file (e.g., pursuant to a write request to the required file), such COW data 119 is not deleted and remains in the snapshot 115. Further, the snapshot 115 continues to monitor all required files such that write operations to a required file continue to be performed using the COW mechanism, generating additional COW data 119 containing the corresponding changes to the files.

Further, once the required file list 130 is received at the client 101-1, the client begins uploading the required files 140 to the server 103, where the required files are stored in the SIS 105. As mentioned, at the beginning of the required file upload 140, the snapshot 115 monitors the required files (to ensure write commands to the required files are performed COW). Once a required file has finished uploading, the snapshot 115 stops monitoring the required file and, if any COW data 119 was produced for the required file (e.g., pursuant to write requests to the required file), such COW data 119 can be deleted from the snapshot 115. To clarify, in this situation, when the COW data 119 is deleted, not all of the COW data 119 is necessarily deleted but only the portion of the COW data 119 that corresponds to the uploaded required file. For example, COW data 119 that was produced for required files that are still monitored should not be deleted.

Further, before deleting the COW data 119 for the uploaded required file, the COW data 119 can be incorporated into the actual file on the client device 101-1 so that the corresponding changes are not lost. For example, the COW data 119 can be incorporated into the actual file by replacing corresponding blocks of the file's data with blocks from the COW data 119, or the differences in the blocks in the COW data 119 can be translated to the corresponding blocks of the actual file.

Consequently, the system continues uploading the required files while monitoring all the required files except the previously uploaded required file. When the next required file finishes uploading, the snapshot 115 stops monitoring such next required file as well and any COW data 119 that was generated for such next required file is also deleted from the snapshot 115 (after incorporating the changes in the COW data 119 into the actual file). The process continues for each required file until all required files are uploaded. Thereafter, the snapshot 115 can be dumped and the backup completed.

Thus, the system is able to optimize the size of the snapshot 115 when performing backups to overcome several of the above-mentioned issues associated with large snapshot size. For example, the system conserves space consumed by the snapshot 115 by deleting the COW data 119 related to any non-required files after determining which files are required, and by not monitoring the non-required files thereafter (thereby avoiding producing further COW data 119 for the non-required files). Further, space is conserved by deleting the COW data 119 related to any uploaded required file after such required file is finished uploading, and by not monitoring the uploaded required file thereafter (thereby avoiding producing further COW data 119 for the required file).

Figure 2:
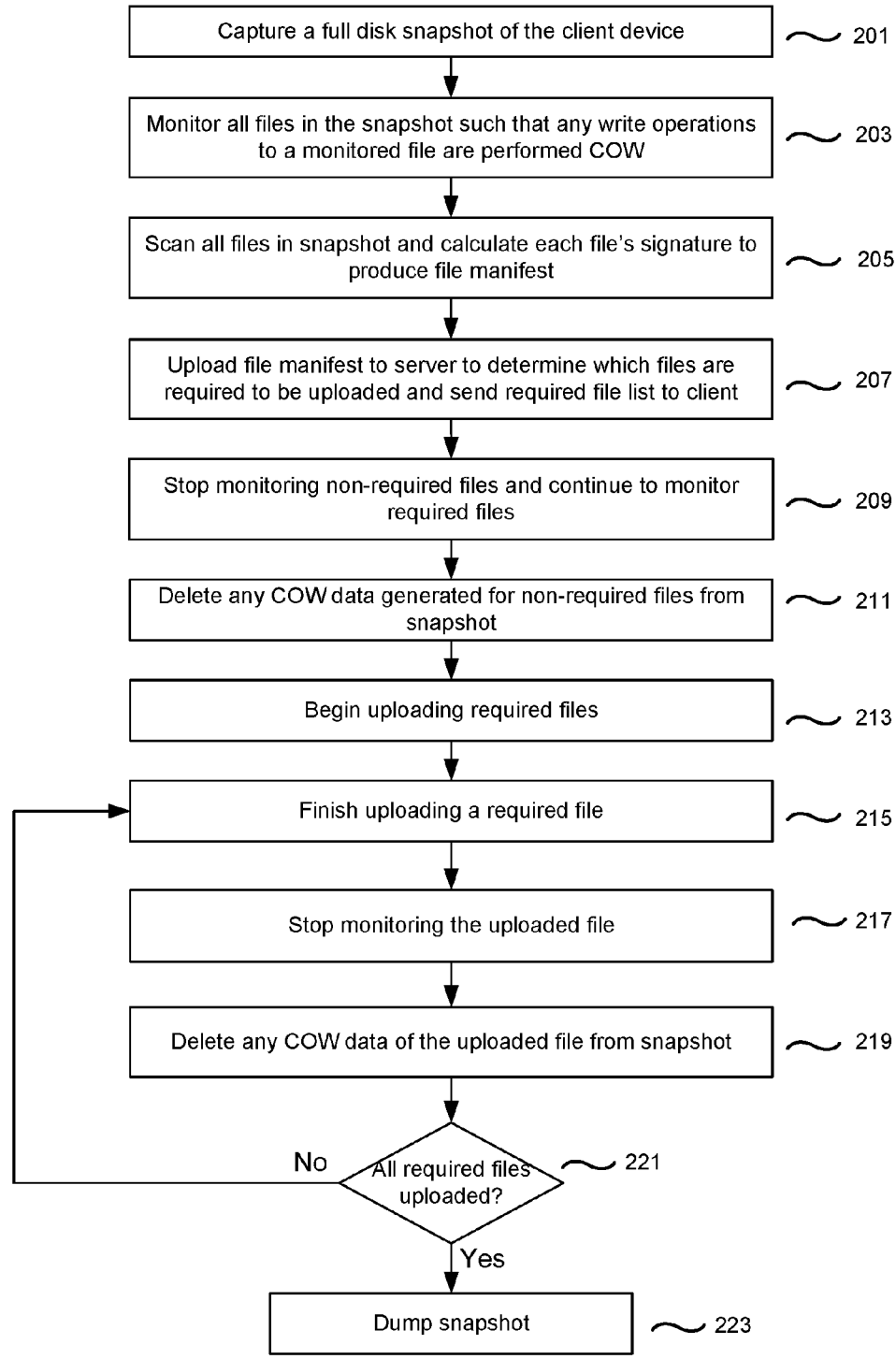
FIG. 2 illustrates an example process flow for performing backups using space optimized snapshots, in accordance with various embodiments.

FIG. 2 illustrates an example process flow for performing backups using space optimized snapshots, in accordance with various embodiments. For example, the process flow of FIG. 2 can correspond to a backup of a client device to a server, such as the client device 101-1 and server 103 of FIG. 1. In operation 201, a full-disk snapshot of the client device is captured. After the snapshot is captured, in operation 203, all files in the snapshot are monitored such that any write operations to a monitored file are performed using the COW mechanism. As described above, COW operations result in COW data being produced in the snapshot. In operation 205, the files in the snapshot are scanned and each file's signature is calculated to produce a file manifest. The file manifest is uploaded to the server to determine which files are required to be uploaded to perform the backup, and the required file list is sent to the client, in operation 207. For example, if desktop images in the system are stored in a single instance store, then the system can compare the files in the manifest with the files in the SIS and determine that the files in the manifest that are not available in the SIS are required.

Once the required file list is received at the client device, in operation 209, the system stops monitoring non-required files and continues to monitor required files, such that write commands to the required files (but not to the non-required files) continue to be performed COW. In operation 211, any COW data that has been generated for non-required files is deleted from the snapshot. Namely, in operation 203, the system began monitoring all files and any write requests to a monitored file would have been produced COW. Accordingly, if any COW data has been generated pursuant to such write requests for files that have been determined to be non-required, such COW data can be deleted from the snapshot in operation 211, thereby freeing up snapshot space. As mentioned previously, prior to deleting such COW data, the data can be translated or transferred to the actual corresponding files in order to preserve any changes made.

Consequently, in operation 213, the system begins uploading the required files from the client to the server. Notably, at this point in the process, all required files are being monitored (see operation 209) and, accordingly, any write operations to a required file are performed COW. In operation 215, the system finishes uploading a required file. Consequently, in operation 217, the system stops monitoring the uploaded file. Hence, subsequent write operations to the file will not be performed COW. Further, if any COW data has been produced for the uploaded file (see operation 209), such COW data of the uploaded file can be deleted from the snapshot in operation 219.

In operation 221, the logic determines whether all required files have been uploaded. If all required files have not been uploaded, then the required file upload proceeds until a next required file finishes uploading 215. Thereafter, in operation 217 the system stops monitoring such next required file, and any COW data of the uploaded file (if any exists) is deleted from the snapshot in operation 219. The process continues for each required file until the logic determines, in operation 221, that all required files are uploaded. Consequently, in operation 223, the snapshot is dumped and the backup process is completed.

The space optimized snapshots, as described herein, not only resolve the issues associated with large snapshot size but also enable new features and capabilities. For example, with space-optimized snapshots, as described herein, a client device may be able to capture and simultaneously store numerous snapshots (which may not be possible with traditional systems where snapshot size may not permit the storing of several snapshots). This may be useful, for example, in a situation where a device is not connected to a network over an extended period of time. In this case, the device may capture and store numerous snapshots during the period of time when the device is offline. Once the device is online, the snapshots can be uploaded to create several backup instances on the server, enabling several restore points corresponding to the offline snapshot captures on the client device.

Figure 3:
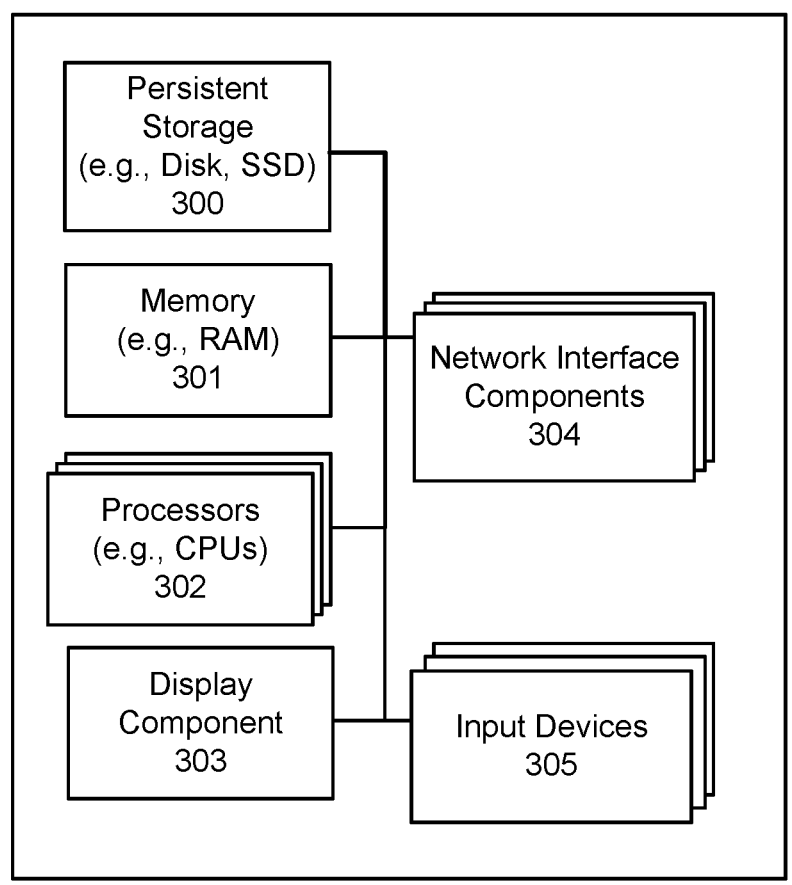
FIG. 3 illustrates an example of some general components of a computing device that can be utilized in conjunction with various embodiments described in the present specification.

FIG. 3 illustrates an example of some general components of a computing device that can be utilized in conjunction with various embodiments described in the present specification. In this particular example, the computing device includes one or more processors (e.g., central processing units (CPUs) 302 for executing instructions that can be stored in a storage medium. The storage medium may take the form of memory 301 (e.g., RAM), persistent storage 300 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 302, a separate form of storage for images or data, a removable memory for sharing information with other devices and the like.

The computing device typically further comprises a display component 303, such as a computer monitor, a touch screen, liquid crystal display (LCD), light-emitting diode (LED) display, or the like. The display component 303 is conventionally used to display images or information to the user so that the user may interact with the computing device. In various embodiments, the computing device will also include a set of input devices 305 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 304 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   capturing a snapshot of a client computing device, the snapshot including files that are stored on the client computing device;
   determining a set of required files in the snapshot to be uploaded from the client device to a backup server for performing a backup of the client device comprising determining which files in the snapshot are not present on the backup server, the backup server implementing a single instance store for storing client backup files, wherein determining the set of required files further comprises:
      calculating a file manifest, the file manifest comprising file signatures of files in the snapshot;
      conveying the file manifest to the backup server;
      based on the file manifest, determining which of the files on the computing device are already present on the server and which files are required; and
      conveying a list of the required files to the client device;
   via a process taking place on the computing device, for each required file in the snapshot,
      performing write operations using a copy-on-write mechanism by writing changes to a copy of the required file data;
      detecting that an upload of the required file to the server is complete; and
      in response to detecting that the upload of the required file to the server is complete, performing subsequent write operations directly on the required file without using the copy-on-write mechanism, while continuing to perform write operations using the copy-on-write mechanism on required files that have not finished uploading.

2. The method of claim 1, further comprising:
   in response to detecting that the upload of the required file to the server is complete, determining whether the required file has been written to using the copy-on-write mechanism; and
   if the required file has been written to using the copy-on-write mechanism, then deleting any corresponding data produced by the writing to the required file using the copy-on-write mechanism.

3. The method of claim 2, further comprising, prior to the deleting any corresponding data produced by the writing to the required file using the copy-on-write mechanism, incorporating the data into the required file on the computing device.

4. The method of claim 1, further comprising receiving a write command for a file other than a required file on the computing device and performing the write command directly on the non-required file on the computing device.

5. The method of claim 1, wherein the determining the set of required files comprises receiving a list of the required files from the backup server.

6. A computing device, comprising:
   at least one processor; and
   memory including instructions that, when executed by the at least one processor, cause the computing device to perform the steps of:
      capturing a snapshot of a client computing device, the snapshot including files that are stored on the client computing device;
      determining a set of required files in the snapshot to be uploaded from the client device to a backup server for performing a backup of the client device comprising determining which files in the snapshot are not present on the backup server, the backup server implementing a single instance store for storing client backup files, wherein determining the set of required files further comprises:
         calculating a file manifest, the file manifest comprising file signatures of files in the snapshot;
         conveying the file manifest to the backup server;
         based on the file manifest, determining which of the files on the computing device are already present on the server and which files are required; and
         conveying a list of the required files to the client device;
      via a process taking place on the computing device, for each required file in the snapshot,
         performing write operations using a copy-on-write mechanism by writing changes to a copy of the required file data;
         detecting that an upload of the required file to the server is complete; and in response to detecting that the upload of the required file to the server is complete, performing subsequent write operations directly on the required file without using the copy-on-write mechanism, while continuing to perform write operations using the copy-on-write mechanism on required files that have not finished uploading.

7. The computing device of claim 6, wherein the memory further includes instructions that when executed by the at least one processor, cause the computing device to perform the steps of:
in response to detecting that the upload of the required file to the server is complete, determining whether the required file has been written to using the copy-on-write mechanism; and
if the required file has been written to using the copy-on-write mechanism, then deleting any corresponding data produced by the writing to the required file using the copy-on-write mechanism.

8. The computing device of claim 7, wherein the memory further includes instructions that when executed by the at least one processor, cause the computing device to perform the steps of:
prior to the deleting any corresponding data produced by the writing to the required file using the copy-on-write mechanism, incorporating the data into the required file on the computing device.

9. The computing device of claim 6, wherein the memory further includes instructions that when executed by the at least one processor, cause the computing device to perform the steps of:
receiving a write command for a file other than a required file on the computing device and performing the write command directly on the non-required file on the computing device.

10. The computing device of claim 6, wherein the determining the set of required files comprises receiving a list of the required files from the backup server.

11. A non-transitory computer readable storage medium comprising one or more sequences of instructions, the instructions when executed by one or more processors causing the one or more processors to execute the operations of:
capturing a snapshot of a client computing device, the snapshot including files that are stored on the client computing device;
determining a set of required files in the snapshot to be uploaded from the client device to a backup server for performing a backup of the client device comprising determining which files in the snapshot are not present on the backup server, the backup server implementing a single instance store for storing client backup files, wherein determining the set of required files further comprises:
calculating a file manifest, the file manifest comprising file signatures of files in the snapshot;
conveying the file manifest to the backup server;
based on the file manifest, determining which of the files on the computing device are already present on the server and which files are required; and
conveying a list of the required files to the client device;
via a process taking place on the computing device, for each required file in the snapshot,
performing write operations using a copy-on-write mechanism by writing changes to a copy of the required file data;
detecting that an upload of the required file to the server is complete; and
in response to detecting that the upload of the required file to the server is complete, performing subsequent write operations directly on the required file without using the copy-on-write mechanism, while continuing to perform write operations using the copy-on-write mechanism on required files that have not finished uploading.

12. The non-transitory computer readable storage medium of claim 11, further comprising instructions that when executed by the one or more processors cause the one or more processors to execute the operations of:
in response to detecting that the upload of the required file to the server is complete, determining whether the required file has been written to using the copy-on-write mechanism; and
if the required file has been written to using the copy-on-write mechanism, then deleting any corresponding data produced by the writing to the required file using the copy-on-write mechanism.

13. The non-transitory computer readable storage medium of claim 11, further comprising instructions that when executed by the one or more processors cause the one or more processors to execute the operations of:
receiving a write command for a file other than a required file on the computing device and performing the write command directly on the non-required file on the computing device.

14. The non-transitory computer readable storage medium of claim 11, wherein the determining the set of required files comprises receiving a list of the required files from the backup server.

* * * * *